2 Sheets—Sheet 1.
J. B. CHAMBERS.
MORTISING MACHINE.
No. 8,966.          Patented May 25, 1852.
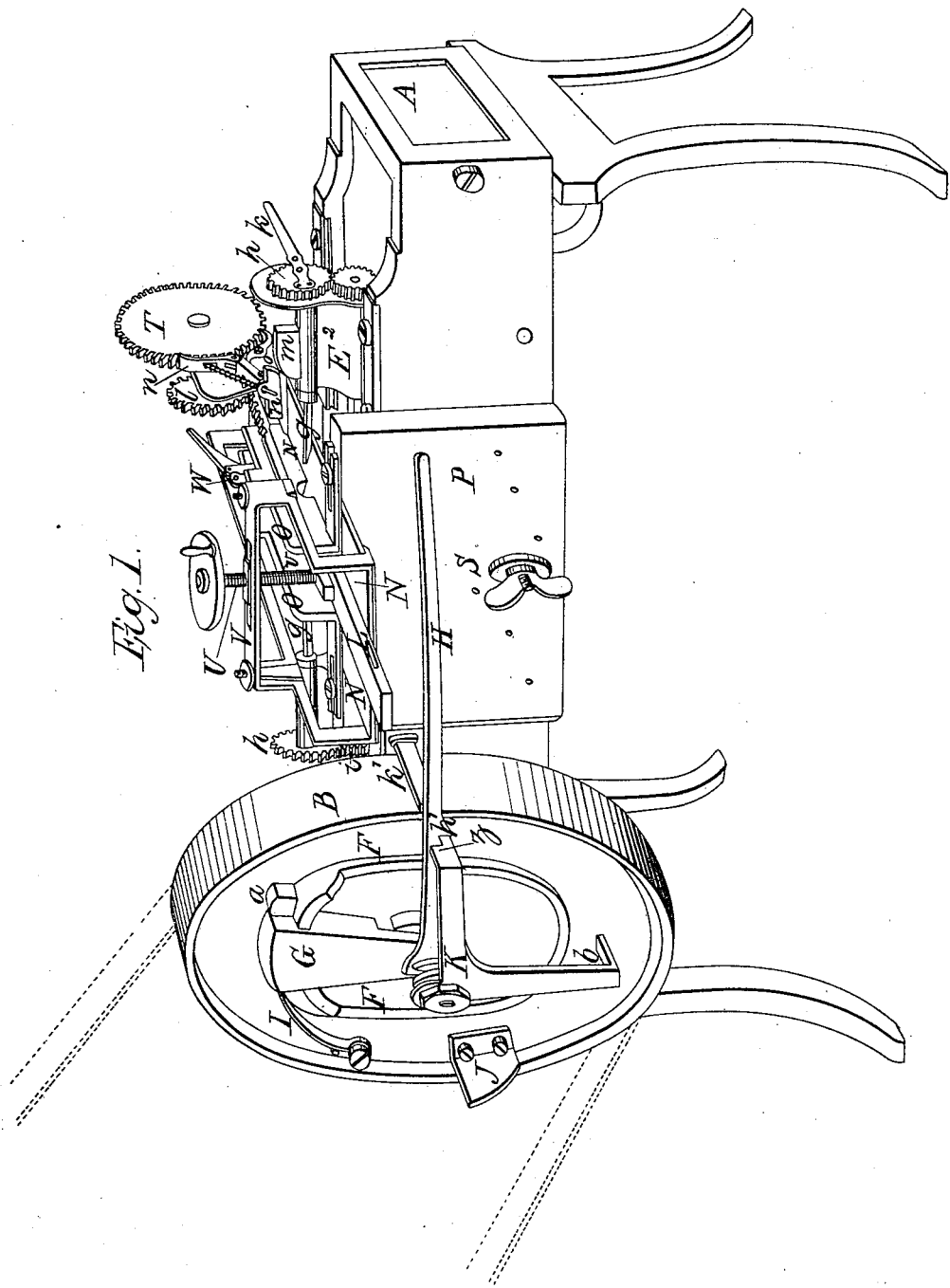

2 Sheets—Sheet 2.
J. B. CHAMBERS.
MORTISING MACHINE.
No. 8,966. Patented May 25, 1852.
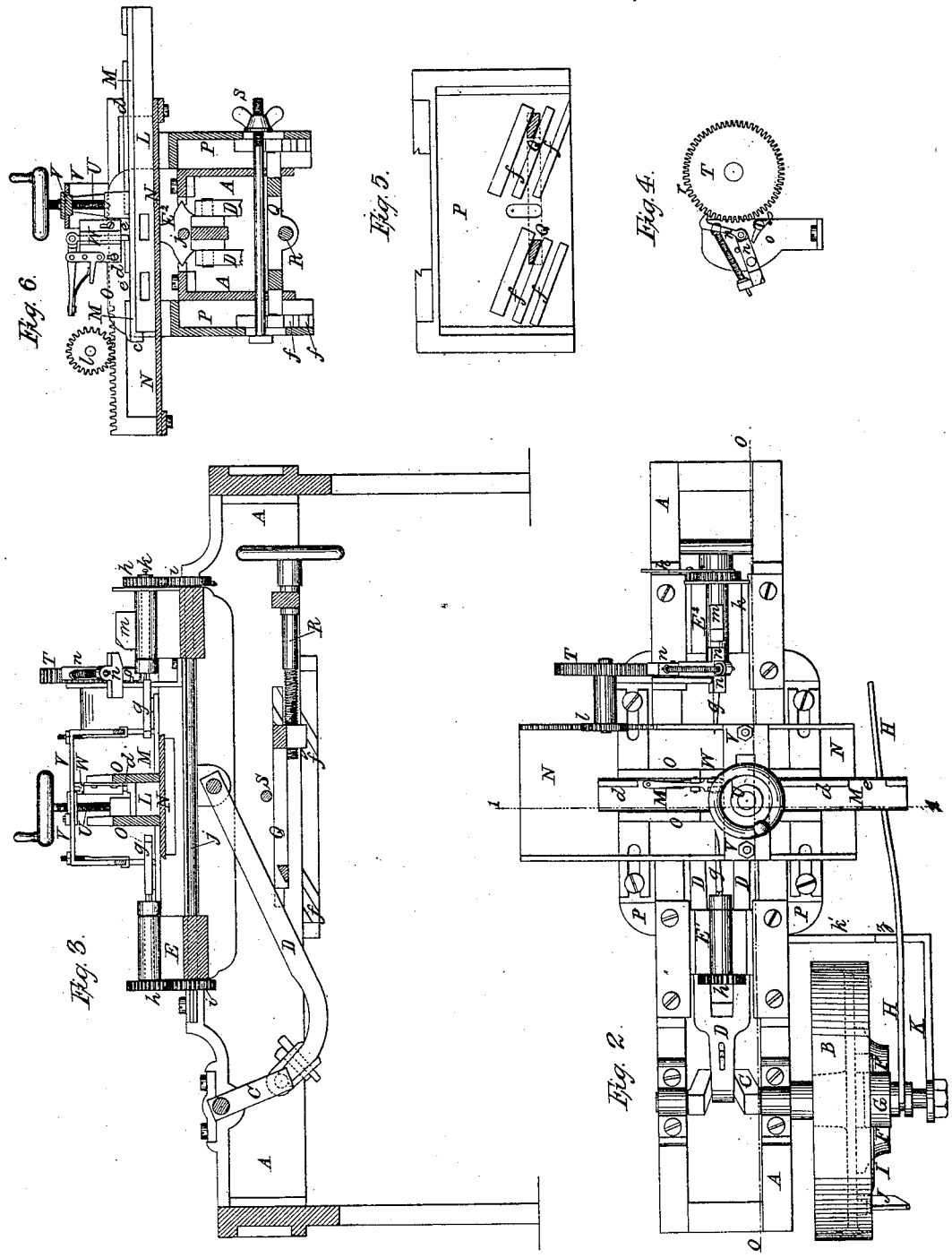

UNITED STATES PATENT OFFICE.

JOHN B. CHAMBERS, OF PITTSBURG, PENNSYLVANIA.

MORTISING-MACHINE.

Specification of Letters Patent No. 8,966, dated May 25, 1852.

*To all whom it may concern:*

Be it known that I, JOHN B. CHAMBERS, of Pittsburg, in the county of Allegheny and State of Pennsylvania, have invented certain new and useful Improvements in Mortising-Machines, composing what I denominate "Chamber's horizontal power mortising-machine;" and I do hereby declare that the following is a full, clear, and exact description of the same, reference being had to the accompanying drawings, (Sheets 1 and 2,) in which—

Figure 1, Sheet 1, is a perspective view. Fig. 2, Sheet 2, is a plan. Fig. 3, Sheet 2, is a longitudinal section through the line 0 0 Fig. 2. Fig. 4, Sheet 2, is a detached side view of the ratchet wheel and pertaining devices for producing the feed. Fig. 5, Sheet 2, is a detached inside view of one of the vertical plates P showing also in red lines the horizontal slide Q which operates it. Fig. 6, Sheet 2, is a transverse section through the line 11 Fig. 2, representing the spring drop-bolt and other parts.

The same letters of reference indicate corresponding parts in each of the several figures.

The nature of my invention consists 1st. In an improvement in the feed gear whereby the ratchet wheel provided with a hook or catch as well as an operating pawl insures a regular and uniform advance of the timber to the chisels and ceases working when the feed is accomplished. 2nd. In so constructing the driving wheel and gearing motion as that the momentum of the chisel holders or slides at their quick points cannot throw the driving arm in advance of the propelling stud on the operating pulley having an uniform motion, also, when arresting the action of the machine always insuring the chisels free of the mortise. These several parts or improvements operating in combination or separately as will be hereinafter set forth.

To enable other skilled in the art to make and use my invention I will proceed to describe fully the several improvements and briefly the parts to which they belong or are attached.

A is the frame of the machine, B the driving pulley intended to be operated by belt and driving the crank C which, through the connecting rod D, communicates the necessary reciprocating motion to the chisel holders or slides $E^1$, $E^2$, connected by a central bar on to which is jointed the rod D; the pulley B is fitted so as to run loosely on the shaft of the crank C and it is made to operate the crank through the following devices:

A ring F is secured tight to the crank shaft the back of the ring lying against the outside face of the pulley and the front of it being provided with a projection having a recess into which fits a sliding arm G that puts the pulley into gear with the crank C when slid deeply into the said recess, and vice versa when slidden partly out, the arm G being thus worked more or less in or out of the recess in the ring F by means of a lever H which, being operated, it causes the arm G to slide on the crank shaft; the arm G when fully within the recess of the ring F causes the pulley B to drive it and (through the ring F being tight to the shaft) the crank C, by means of a stud $a$ on the outside face of the pulley, which stud projects only so much as to clear the arm G when partly out of the recess but when fully in to press against it on the one edge and so drive the machine, the arm G being sufficiently long for (when fully in the recess) the stud $a$ to strike it.

I is a spring fitted on the outside face of the pulley B and serving to admit of the arm G being slid fully into its recess in the ring F (for the stud $a$ to operate the arm) at any point of or during the continued motion of the pulley and further serving, in conjunction with the stud $a$, to hold the arm G in between them so that the arm G cannot, by the momentum as produced by the irregular velocity of the chisel slides $E^1$, and $E^2$ (an irregularity peculiar to all crank motions) fly from or work in advance of the driving stud $a$ which, being attached to the pulley B, has an uniform motion. J is an inclined projection secured to the pulley B and answering to throw the arm G out of gear with the pulley when the lever H is so pressed inward to the side of the machine as that the projection J in coming around will slide it and the arm G outward; the lever H, it may be observed, being so hung or supported and formed as that (as is common with well known clutch lever devices having sliding fulcra) it may be either turned or swiveled on the arm on which it rests—constituting its fulcrum,—or may be slid toward or away from the side of the machine; the said lever resting by stepped notch $h^1$, in and lapping against a sufficiently long mortise $z$ made in an arm $k^1$, so that the hand of the operator being brought to press the outer end of the said lever H toward or against the side of the machine, it (the lever) will be slid along the mortise $z$, whereby the incline J, in coming around, will strike and slide the inner end of the lever outward and with it the arm G which it clutches or clasps. When desired to put the arm G again in gear, the outer shoulder of the mortise $z$ (against which the lever has been pressed by the incline J) forms a fulcrum for the operator to swivel or work the outer end of the lever away from the machine and so put in gear the arm G. On the operator again pressing the outer arm of the lever toward the side of the machine, it (the lever) is slid along the mortise $z$ and thereby appropriately situated for action upon by the incline J, as before.

The projection J is situated in such a relative position as regards the crank C as to insure the crank being stopped when the chisels are out of the mortise they have been cutting, and in order to prevent the momentum of the chisel slides $E^1$, $E^2$, continuing the action a stationary supporting branch K provided with a vertical bent leg $b$ serves for the arm G to strike and rest against, thereby arresting the specified momentum as the arm G is never wholly out of gear with the ring F (tight to the crank shaft). The inclined projection J may be either permanently attached to the pulley B or made adjustable to any required set. The arm G it will be observed occupies such a relative position to the crank C as that when it rests against the bent leg $b$ the chisels on either side are out of the mortise. Thus it will be seen that when desired to arrest the motion of the chisels, the lever H, as before observed, is pressed inward so that the inclined projection J strikes it and draws the arm G out of gear with the propelling stud $a$; and, when putting the arm G again into gear with the stud $a$, any jerk or shock, liable to be produced by the latter striking the former, is obviated through means of the spring I which, as the pulley B revolves, rides gradually over the arm, setting it slightly in motion, and, as already specified, prevents the arm G running in advance of the stud $a$. By the setting of the crank C in relation to the arm G so that the chisels are free of the mortise when their movement is arrested, the said chisels are accessible for repair, and when the mortise is completed the timber may be withdrawn without risk of damage to or breakage of the chisels.

L represents a piece of timber being operated on. It is situated transversely on the machine, and, to obviate laying or setting out in it the required mortises, I propose to use a gage or pattern M which I place on the face of the timber and which has a lip $c$ at its one end lapping over one end of the timber and a rib $d$ on its one side made with notches $e$ $e$ in it corresponding in position and length to the required mortises in the timber. The gage M not only saves time and labor in marking out and adjusting the timber for formation of the several mortises but insures the greatest accuracy when a number of pieces requiring corresponding mortises have to be operated on as the one pattern or gage (any number of different ones being kept in stock to suit different work) is placed successively upon each. The further operation and use of the gage will be presently more fully referred to. The timber L rests upon a bed H between adjustable guides O O which are stationary as regards the travel of the bed. The bed N is raised or lowered, according as the mortise to be cut requires, by means of slides P P on which it rests at either end and travels crosswise over, the slides P P having a vertical motion given them through inclined or oblique grooves $f$ $f$ made on the inner faces of each into which grooves projecting studs of a horizontal slide Q fit, a screw R serving to operate the slide Q and thereby adjust higher or lower with the greatest nicety the bed N.

S is a set nut and screw for securely holding the slides P P when set to their required height, the rod of the screw passing through either slide P P.

$E^1$, $E^2$, are the chisel holders or slides. They resemble headstocks and have a reciprocating horizontal motion so that the chisels $g$ $g$ will (either one) cut rather better than half through the timber L on either side to form the mortise. An auger hole, as usual, is first bored in the timber at the one end of the intended mortise and the chisels paring that end square reciprocate their action till the mortise is cut (as customary with other machines); but as the chisels are straight on their one face and beveled on the other to form a proper cutting edge, they require reversing after performing their first double stroke which merely serves to pare out square the one end of the mortise. They are then turned half around so as to present their beveled edge toward the incision made and their flat faces, or backs, toward what may be termed the uncut end of the mortise. This is the case with all or most machines of the kind, and my improvement as regards the reciprocating chisels merely relates to the method which I adopt of simultaneously reversing them; this I do by means of pinions $h$ $h$ attached to the mandrels which hold the chisels and which are so fitted in the chisel holders as to turn, the pinions $h$ $h$ meshing into pinions $i$ $i$ (of the same diameter) connected by a shaft $j$.

$k$ is a handle operating the several pinions $h$ $h$ and $i$ $i$ by its being attached to one of them, when turned half around, either way, it causes both chisels to be simultaneously reversed thereby avoiding the loss of time of turning each chisel separately, any suitable contrivance being adopted to prevent the handle when turned from moving out of its set position and the chisels from turning except when purposely required.

The contrivances for arresting and throwing the machine into action have already been described and need not again be adverted to, it being remembered that such in cutting out any number of mortises in the timber is necessary.

The bed N on which the timber is held has its feed or travel (for the formation of a mortise) crosswise of the machine communicated to it by the following devices.

A ratchet wheel T supported by bracket to one of the vertical slides P has a pinion $l$ on its shaft which, as the wheel T turns, gives motion to the bed N, the pinion $l$ gearing into a rack at one end on the side of the bed; the ratchet wheel T is operated by the reciprocating motion of one of the chisel holders $E^2$, which has a suitably shaped projection $m$ on it that operates a reach arm or dragging pall $n$ kept up to its bite by a spring on the back and made to actuate, as the ratchet wheel is pulled one tooth, a separate pall or hook $o$ which fitting into between each two adjoining teeth successively of the ratchet serves to hold the latter from being carried further than the proper feed which effect is liable to be produced by the sudden and rapid motion given to the bed N the momentum of which might throw the reach arm out from between the teeth, and which if occurring would make the cut to be performed by the chisels too great and might therefore damage them and would make the feed irregular; the pall $o$ thus acts as a stop motion: One tooth, marked $r$, of the ratchet wheel, is beveled on its one edge so as to admit of the pall $n$ biting deeper in over it than it does between the other teeth and sufficiently deep so as the motion of the projection $m$ will not move it out of its bite whereby the feed is stopped until again starting it by relieving the pall $n$ through hand and turning the ratchet wheel as many teeth back as is necessary to give a proper amount of feed to produce a requisite length of mortise; the pall $n$ is then dropped into gear with the ratchet wheel and continues to turn it, a tooth at a time, until the beveled tooth $r$ again reaches under the pall $n$ when the feed motion as specified is stopped. The action of the ratchet wheel T by the pall $n$ is similar to other feeding motions in different machines, the pall $n$ feeding the timber a tooth at a time as the projection $m$ in its reciprocating movement operates the pall; the object of the hook $o$ has before been specified; it serves to lock the feed given by the striking of the projection $m$ under the pall $n$, and prevents or checks the momentum of such blow or strike from carrying the ratchet wheel T beyond its required movement. The beveled tooth $r$ of the ratchet wheel allows of the pall $n$ entering between it and the adjoining tooth to such a depth as that the projection $m$ will be unable to raise the pall therefrom and so stop the feed, this tooth ($r$) comes around to the pall $n$ when the mortise is cut and in starting a new mortise, the palls being relieved by hand from their bite, the wheel T is turned as many teeth back (counting from the tooth $r$) as forms the measurement of the mortise.

The timber L is held on the bed N by a set screw V working through an adjustable bracket or framing V connected with the sides of the bed N.

W is a spring drop bolt connected with one of the stationary guides $o$, it may be constructed in any suitable way so that it (the bolt) presses down into the notches $e$ $e$ of the gage M, it fitting in each notch $e$ $e$ as they severally are brought under it; the use of this spring drop bolt is to set the timber to its proper position for formation of the mortise; this is done by simply pushing up the timber, along with the gage M, on the bed N till the drop bolt W dropping into one of the recesses $e$ is found to prevent the further movement of the timber by the spring drop bolt W meeting the end of the recess $e$ corresponding to the first cut extremity of the mortise; the machine and regular feed action is then set in motion and continues till the other end of the recess $e$ strikes the bolt W when the mortise is cut, and, the bolt W being relieved by hand, the timber L and gage M are again pushed up on the bed till the drop bolt falls into the next recess $e$ corresponding to a second or further mortise which the timber is designed to have; the action of mortise cutting then proceeds as before; the set screw V is slackened and tightened alternately as the timber is moved up or set on the bed; the lip $c$ of the gage serves to keep the latter from sliding along the timber out of its place and the rib $d$ answers for the drop bolt to rest upon when moving the timber and gage till the drop bolt drops into the several notches $e$ $e$ as described.

Having thus fully described my several improvements and sufficiently so for the better illustration of the former the parts (not new) connected therewith and constituting in combination the machine I desire it to be understood that the main principle of action, involving reciprocating chisels and by a ratchet wheel feeding on the timber, is not by any means new nor do I claim such, these being well known and common to other mortising machines, nor yet do I claim the chisels, neither do I claim separately of themselves the devices by which I effect my improvements; but What I do claim as my invention and desire to secure by Letters Patent is—

1. The employment of a stop catch or hook $o$, operated on by the reach arm or pall $n$ to prevent the momentum given to the ratchet wheel T, from throwing the pall $n$ out from between the teeth after having performed its pull and so making irregular the feed, one ($r$) of the ratchet wheel teeth being beveled or reduced in order to admit of the pall $n$ entering sufficiently deep to arrest the motion of the feed in the manner and for the purpose set forth.

2. The combination and arrangement of the stud $a$, clutch-arm G, lever H, cam J, and stop $b$, so that when the lever H is thrown in, the cam J, will unclutch the machine when the chisel crank $c$, is on the full center, and the chisels are out of the work, and retain them in that position by the clutch G, coming in contact with the stop $b$,—the several parts being made, arranged, and operated in the manner herein fully set forth.

In testimony whereof I have hereunto signed my name before two subscribing witnesses.

JOHN B. CHAMBERS.

Witnesses:
 WM. P. ELLIOT,
 OLIVER LESBY.